United States Patent [19]

Lin

[11] Patent Number: 5,353,654

[45] Date of Patent: Oct. 11, 1994

[54] TESTING FACILITY FOR WRENCHES

[76] Inventor: Chi Y. Lin, No. 5-11, Lane 42, Jen Hua Rd., Ta Li Hsiang, Taichung Hsien, Taiwan

[21] Appl. No.: 938,406

[22] Filed: Aug. 31, 1992

[51] Int. Cl.$^5$ .......................................... G01M 19/00
[52] U.S. Cl. ..................................... 73/865.9; 73/808
[58] Field of Search ........................ 73/865.9, 808, 1 C

[56] References Cited

U.S. PATENT DOCUMENTS

| | | | |
|---|---|---|---|
| 2,411,931 | 12/1946 | McVey | 73/1 C |
| 2,955,454 | 10/1960 | Husher | 73/1 C |
| 3,979,942 | 9/1976 | Grabovac | 73/1 C |
| 4,171,647 | 10/1979 | Herrgen | 73/1 C X |
| 4,376,386 | 3/1983 | Green | 73/1 C |
| 4,517,821 | 5/1985 | Taggart et al. | 73/1 C |
| 4,543,814 | 10/1985 | Heilman | 73/1 C |
| 5,181,425 | 1/1993 | Livingston | 73/1 C X |

FOREIGN PATENT DOCUMENTS 1654693  6/1991  U.S.S.R. ............................ 73/1 C

*Primary Examiner*—Tom Noland
*Attorney, Agent, or Firm*—Biebel & French

[57] ABSTRACT

A device for testing a wrench including a base fixed in a housing, a cylinder disposed in the base and having a piston rod extended upward, a support fixed on top of the piston rod for supporting the handle portion of the wrench, the socket of the wrench is retained in place and the handle portion of the wrench is pushed upward in a repeated action by the cylinder so as to test the working life of the wrench.

4 Claims, 5 Drawing Sheets

TESTING FACILITY FOR WRENCHES

BACKGROUND OF THE INVENTION

1. Field of the Invention

The present invention relates to a testing facility, and more particularly to a testing facility for wrenches.

2. Description of the Prior Art

Generally, the newly developed wrenches should be tested before mass production. The manufacturers usually send the wrenches to a famous lab for testing purposes. This wastes time. Furthermore, the secret of the wrenches may be disclosed inadvertently.

The present invention has arisen to mitigate and/or obviate the afore-described disadvantages of the conventional wrench testing problems.

SUMMARY OF THE INVENTION

The primary objective of the present invention is to provide a testing facility with which the wrenches can be easily tested.

In accordance with one aspect of the invention, there is provided a facility for testing a wrench comprising a base fixed on a housing, a cylinder disposed in the base and including a piston rod extended upward therefrom, a support fixed on top of the piston rod for supporting a handle portion of the wrench, a shaft disposed in the housing and engaged in a socket of the wrench to be tested, whereby, the handle portion of the wrench is pushed upward in a repeated action by the piston rod of the cylinder in order to test the working life of the wrench.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
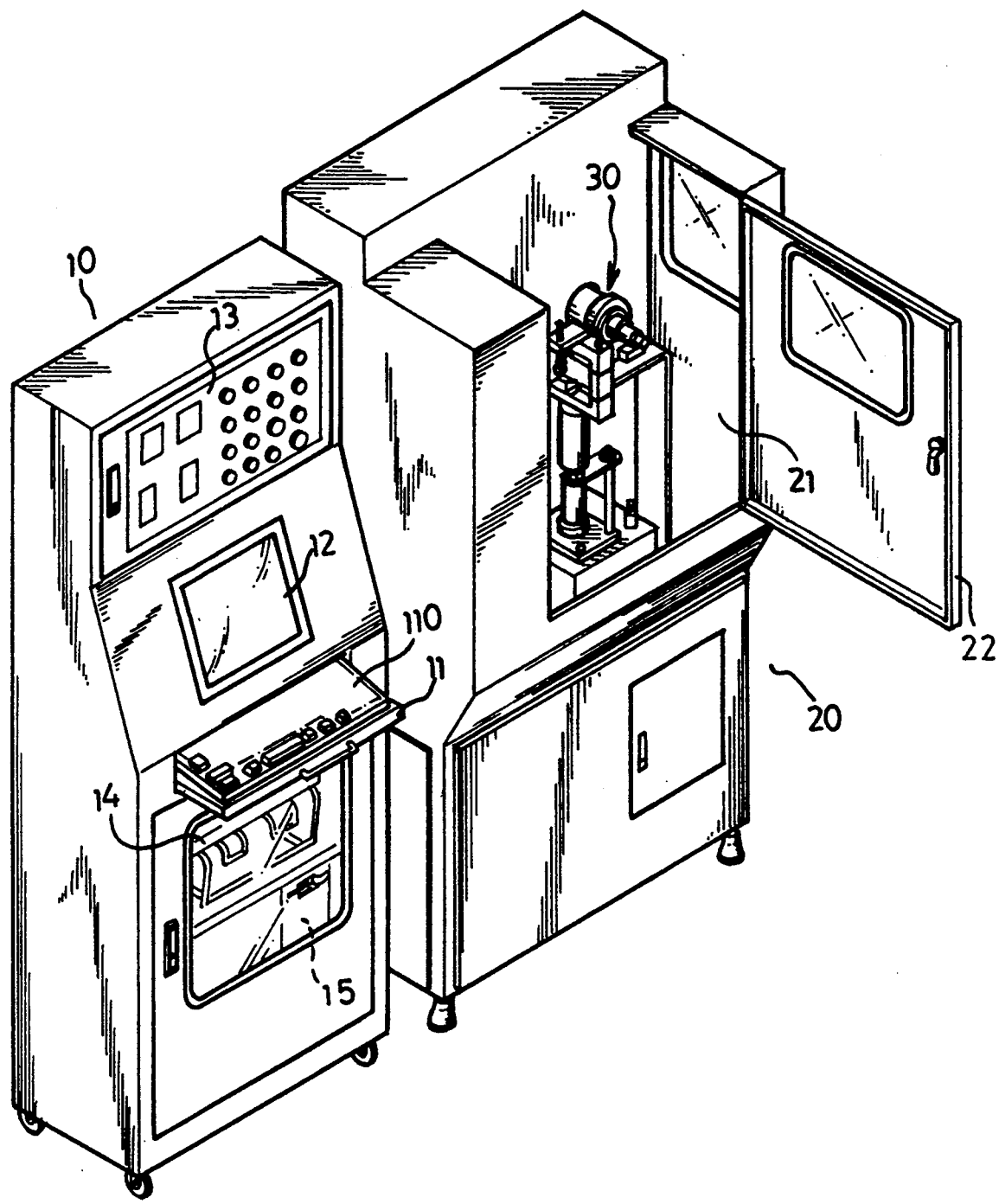
FIG. 1 is a perspective view of a testing facility in accordance with the present invention.

Referring to the drawings, and initially to FIG. 1, a testing facility in accordance with the present invention comprises generally a control station 10 and a testing station 20 disposed side by side, the control station 10 includes a central processing unit 15 and a printer 14 disposed in the lower portion thereof, a drawer 11 disposed in the middle portion for supporting a key board 110 with which data can be entered into the central processing unit 15, a monitor 12 disposed above the drawer 11, and a control board 13 provided on the upper portion thereof. The testing station 20 includes a testing mechanism 30 disposed in a housing 21 thereof and the housing 21 is enclosed by a cover 22.

Figure 2:
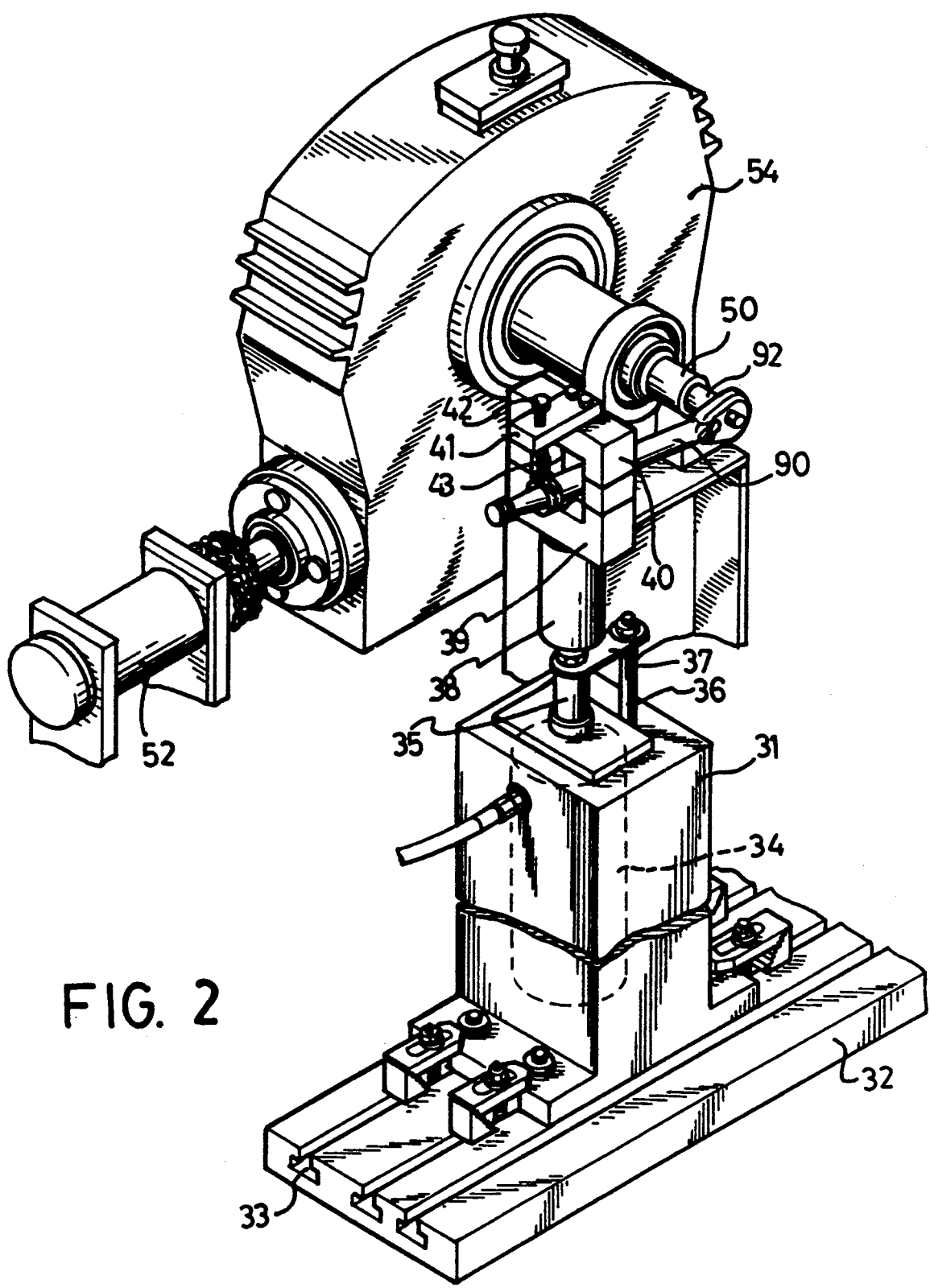
FIG. 2 is a partial perspective view illustrating the testing mechanism of the testing facility.
Figure 3:
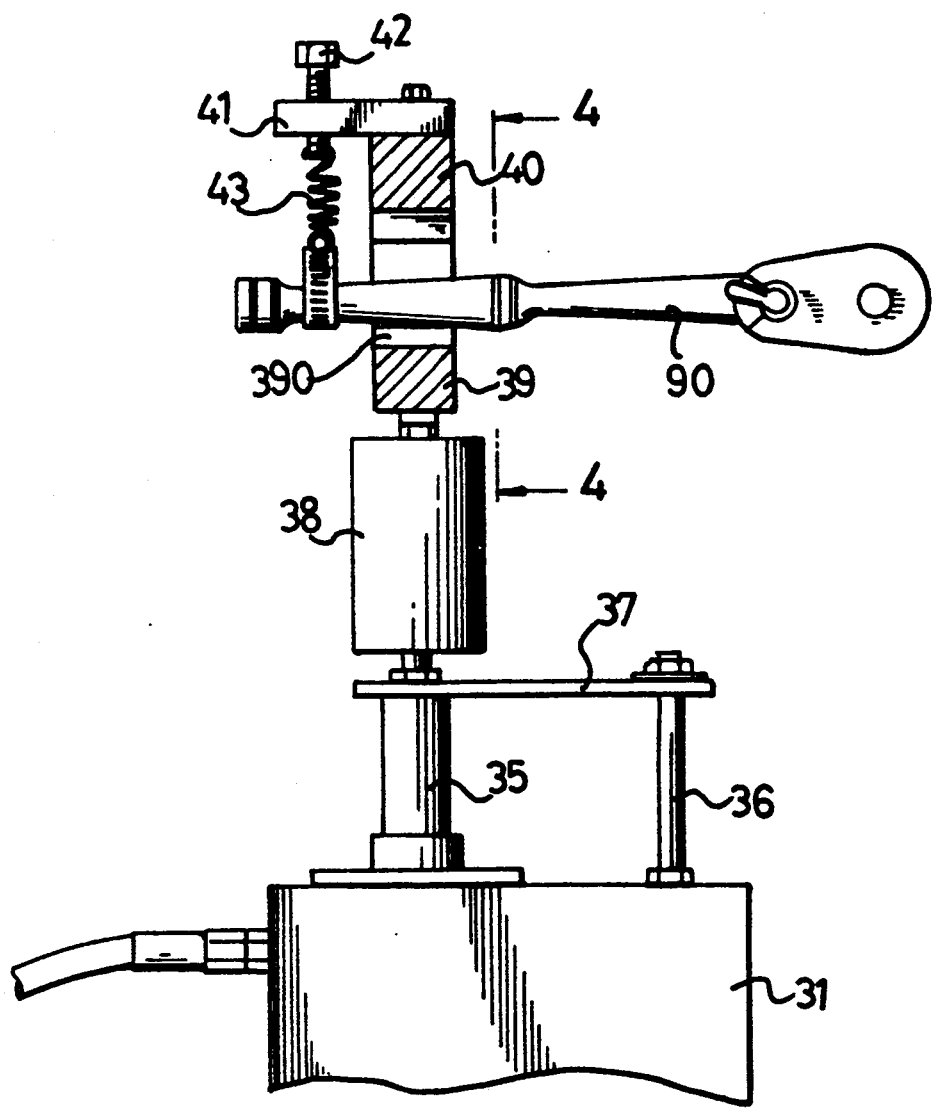
FIG. 3 is a partial cross sectional views of the testing mechanism.
Figure 4:
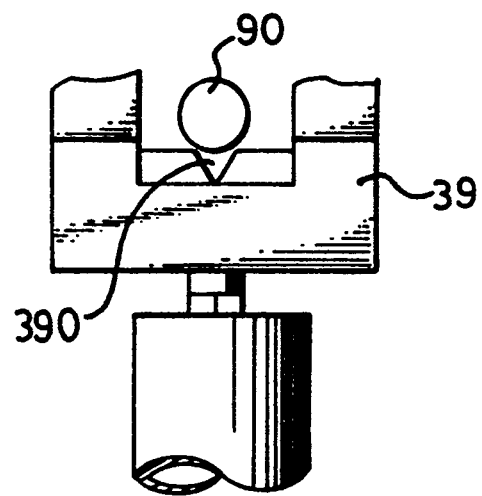
FIG. 4 is a partial cross sectional view taken along lines 4—4 of FIG. 3.

Referring next to FIGS. 2, 3 and 4, the testing mechanism 30 includes a base 31 slidably engaged on the plate 32 by dovetail/dovetail slot engagement 33, a cylinder 34 disposed in the base 31 and having a piston rod 35 extended upwards, a post 36 slidably engaged in the base 31 and having an upper end fixed to the upper end of the piston rod 35 by a link 37 such that the post 36 moves upward and downward in concert with the piston rod 35 and such that the piston rod 35 is prevented from rotating movement. A stub 38 is fixed on the upper end of the piston rod 35 and a U-shaped support 39 is fixed on top of the stub 38, as best shown in FIG. 4, a V-shaped notch 390 is formed in the support 39 for receiving the handle portion of a wrench 90. An inverted U-shaped frame 40 is fixed on top of the support 39, a bar 41 is fixed on top of the frame 40 and extended outwards of the frame 40, a bolt 42 is threadedly engaged on the bar 41 and coupled to the handle portion of the wrench 90 by a spring 43 such that the handle portion of the wrench 90 is preloaded in an upward direction and so that the handle portion of the wrench 90 can be held in place.

As shown in FIG. 2, the wrench 90 includes a socket 92 which is engaged on a shaft 50, similar to the engagement on a bolt, such that the socket 92 is retained in place and can not be rotated relative to the shaft 50, the shaft 50 can be driven and rotated by a step motor 52, and a reduction gear 54 is coupled between the step motor 52 and the shaft 50 for reducing the rotational speed of the step motor 52. The base 31 can be adjusted longitudinally along the plate 32 so that wrenches of various lengths can be suitably supported by the support 39.

Figure 5:
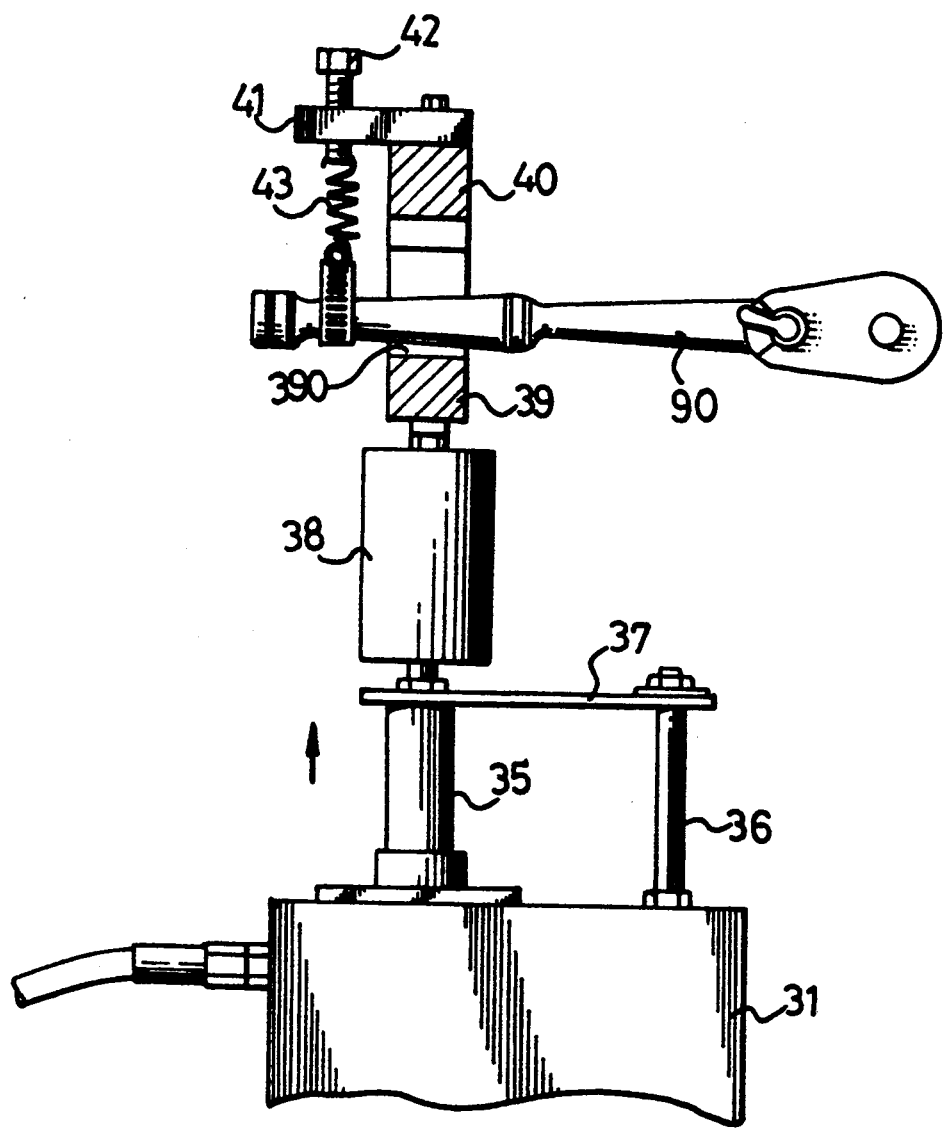
FIG. 5 is a partial cross sectional views of the testing mechanism illustrating the operations thereof.

In operation, as shown in FIGS. 3 and 5, the support 39 is caused to move upwards and downwards by the piston rod 35 of the cylinder 34 in order to push the handle portion of the wrench 90 upwards repeatedly and so as to test the strength of the socket 92 of the wrench 90. The wrench can be pushed tens of thousands of times easily by the support 39, and the number of pushing of the wrench can be entered into the central processing unit 15 of the control station 10 via the key board 110 (FIG. 1).

The shaft 50 and the socket 92 can be rotated by the step motor 52, and the testing described above can be repeated.

Accordingly, the working life of the wrenches can be easily tested by the testing facility in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A facility for testing a wrench, comprising:
    a housing, a testing mechanism including a base fixed on said housing, a cylinder disposed in said base and including a piston rod extending upward therefrom, a support fixed on top of said piston rod for supporting a handle portion of said wrench, a shaft disposed in said housing and engaged in a socket of said wrench to be tested, wherein said handle portion of said wrench is pushed upward in a repeated action by said piston rod of said cylinder in order to test the working life of said wrench, and wherein a post is slidably engaged in said base and including an upper end coupled to an upper end of said piston rod, wherein said post moves upward and downward in concert with said piston rod in order to prevent the rotation of said piston rod.

2. A facility for testing a wrench, comprising: a housing, a testing mechanism including a based fixed on said housing, a cylinder disposed in said base and including a piston rod extending upward therefrom, a support fixed on top of said piston rod for supporting a handle portion of said wrench, wherein said support includes a notch formed therein for receiving said handle portion of said wrench, a shaft disposed in said housing and engaged in a socket of said wrench to be tested, wherein said handle portion of said wrench is pushed upward in a repeated action by said piston rod of said cylinder in order to test the working life of said wrench, said testing mechanism further includes a frame fixed on said support, a bar fixed on top of said frame and extended outwards of said frame, and a spring coupled between said bar and said handle portion of said wrench in order to hold said handle portion of said wrench in place.

3. A facility for testing a wrench comprising a housing; and a testing mechanism including a base fixed on said housing, a cylinder disposed in said base and including a piston rod extended upward therefrom, a post slidably engaged in said base and including an upper end coupled to an upper end of said piston rod, said post moving upward and downward in concert with said piston rod in order to prevent the rotation of said piston rod, a support fixed on top of said piston rod and including a notch formed therein for receiving and supporting a handle portion of said wrench, a frame fixed on said support, a bar fixed on top of said frame and extended outwards of said frame, a spring coupled between said bar and said handle portion of said wrench in order to hold said handle portion of said wrench in place, a shaft disposed in said housing and engaged in a socket of said wrench to be tested, whereby, said handle portion of said wrench is pushed upward in a repeated action by said piston rod of said cylinder in order to test the working life of said wrench.

4. A testing facility according to claim 3 further comprising a step motor coupled to said shaft in order to rotate said shaft.

* * * * *